US007820731B2

(12) United States Patent
Odell et al.

(10) Patent No.: US 7,820,731 B2
(45) Date of Patent: Oct. 26, 2010

(54) RADIATION CURABLE INKS

(75) Inventors: Peter G. Odell, Mississauga (CA); Eniko Toma, Mississuaga (CA); Jennifer L. Belelie, Oakville (CA); Christopher A. Wagner, Toronto (CA)

(73) Assignee: Xerox Corporation, Norwalk, CT (US)

(*) Notice: Subject to any disclaimer, the term of this patent is extended or adjusted under 35 U.S.C. 154(b) by 1273 days.

(21) Appl. No.: 11/275,147

(22) Filed: Dec. 15, 2005

(65) Prior Publication Data

US 2007/0142492 A1 Jun. 21, 2007

(51) Int. Cl.

| | |
|---|---|
| ***C08F 2/50*** | (2006.01) |
| ***C08J 3/28*** | (2006.01) |
| ***C09D 11/10*** | (2006.01) |
| ***C09D 11/02*** | (2006.01) |
| ***C09D 11/00*** | (2006.01) |

(52) U.S. Cl. .......................... 522/74; 522/96; 522/104; 522/90; 522/106; 522/107; 522/113; 522/114; 522/120; 522/121; 522/153; 522/178; 522/182; 106/31.13; 106/31.6; 106/31.61; 106/31.62; 106/31.63; 106/31.29; 106/31.27; 106/31.3; 106/31.31; 523/160; 523/161

(58) Field of Classification Search ............. 106/31.13, 106/31.6, 31.61, 31.62, 31.63, 31.29, 31.27, 106/31.3, 31.31; 522/96, 104.106, 107, 13, 522/114, 120, 121, 150, 153, 178, 182; 523/160, 523/161

See application file for complete search history.

(56) References Cited

U.S. PATENT DOCUMENTS

| | | | | |
|---|---|---|---|---|
| 5,804,671 | A | 9/1998 | Dones et al. | |
| 5,889,076 | A | 3/1999 | Dones et al. | |
| 5,892,116 | A | 4/1999 | Weiss et al. | |
| 6,239,189 | B1 * | 5/2001 | Narayan et al. | 522/40 |
| 6,316,517 | B1 | 11/2001 | Dones et al. | |
| 6,399,713 | B1 | 6/2002 | MacQueen et al. | |
| 6,492,458 | B1 | 12/2002 | Pavlin | |
| 6,547,380 | B2 | 4/2003 | Smith et al. | |
| 6,586,492 | B1 * | 7/2003 | Caiger et al. | 522/75 |
| 6,896,937 | B2 * | 5/2005 | Woudenberg | 427/511 |
| 7,563,489 | B2 * | 7/2009 | Carlini et al. | 427/466 |
| 2003/0036587 | A1 | 2/2003 | Kozak | |
| 2003/0065084 | A1 | 4/2003 | MacQueen et al. | |
| 2007/0120922 | A1 * | 5/2007 | Belelie et al. | 347/100 |
| 2007/0120925 | A1 * | 5/2007 | Belelie et al. | 347/100 |

FOREIGN PATENT DOCUMENTS

| | | |
|---|---|---|
| EP | 1 072 659 B1 | 1/2001 |
| WO | WO 97/24364 | 7/1997 |

OTHER PUBLICATIONS

U.S. Appl. No. 11/018,378, filed Dec. 22, 2004, Odell et al.
U.S. Appl. No. 11/034,714, filed Jan. 14, 2005, Belelie et al.
U.S. Appl. No. 11/034,850, filed Jan. 14, 2005, Odell et al.
U.S. Appl. No. 11/034,856, filed Jan. 14, 2005, Odell et al.
U.S. Appl. No. 11/034,866, filed Jan. 14, 2005, Bedford et al.
U.S. Appl. No. 11/289,609, filed Nov. 30, 2005, Odell et al.
U.S. Appl. No. 11/289,573, filed Nov. 30, 2005, Kovacs et al.
U.S. Appl. No. 11/289,605, filed Nov. 30, 2005, Kovacs et al.
U.S. Appl. No. 11/289,521, field Nov. 30, 2005, Belelie et al.
U.S. Appl. No. 11/289,615, filed Nov. 30, 2005, Belelie et al.
U.S. Appl. No. 11/289,552, filed Nov. 30, 2005, Belelie et al.
U.S. Appl. No. 11/289,620, filed Nov. 30, 2005, Odell et al.
U.S. Appl. No. 11/289,375, filed Nov. 30, 2005, VanBesien et al.
U.S. Appl. No. 11/289,473, filed Nov. 30, 2005, Carlini et al.

* cited by examiner

*Primary Examiner*—Sanza L McClendon
(74) *Attorney, Agent, or Firm*—Oliff & Berridge, PLC

(57) ABSTRACT

A radiation curable ink includes a curable monomer or oligomer, a curable wax, a colorant, and at least one initiator.

20 Claims, No Drawings

RADIATION CURABLE INKS

TECHNICAL FIELD

This disclosure is generally directed to curable inks, such as curable phase change inks, and their use in methods for forming) images, such as their use in ink jet printing. More particularly, this disclosure is directed to radiation curable inks, such as ultraviolet light curable phase change inks, that comprise a curable monomer or oligomer, a curable wax, an optional colorant and an optional radiation-activated initiator that initiates polymerization of the curable monomer or oligomer and the curable wax.

RELATED APPLICATIONS

Commonly assigned, U.S. patent application Ser. No. 11/289,609 filed Nov. 30, 2005 to Peter G. Odell et al., describes a radiation curable phase change ink comprising an ink vehicle that includes a curable gellant comprised of a curable polyamide-epoxy acrylate component and a polyamide component, and at least one colorant.

Commonly assigned, U.S. patent application Ser. No. 11/289,573 filed Nov. 30, 2005 to (Gregory J. Kovacs et al., describes a pre-treatment composition comprising: one or more organic liquids chosen from the group consisting of $C_6$-$C_{30}$ linear alkanes, $C_6$-$C_{30}$ branched alkanes, $C_6$-$C_{30}$ linear alkenes and $C_6$-$C_{30}$ branched alkenes, and mixtures thereof, and one or more cross-linking initiators chosen from the group consisting of peroxy compounds and azo compounds.

Commonly assigned, U.S. patent application Ser. No. 11/289,605 filed Nov. 30, 2005 to (Gregory J. Kovacs et al., describes an ink-jettable overcoat composition for providing high-gloss, high-quality, and durable images, comprising: one or more organic liquids chosen from the group consisting of $C_6$-$C_{30}$ linear alkanes, $C_6$-$C_{30}$ branched alkanes, $C_6$-$C_{30}$ linear alkenes and $C_6$-$C_{30}$ branched alkenes, and mixtures thereof, and one or more film-forming materials.

Commonly assigned, U.S. patent application Ser. No. 11/289,521 filed Nov. 30, 2005 to Jennifer L. Belelie et al., describes a composition, comprising: (a) curable monomer; (b) at least one photoinitiator that initiates polymerization of the curable monomer; and (c) phase change agent that provides the composition with an increase in viscosity of at least four orders of magnitude, from a first temperature, the first temperature being from 50° C. to 130° C., to a second temperature, the second temperature being from 0° C. to 70° C., wherein the second temperature is at least 10° C. below the first temperature.

Commonly assigned, U.S. patent application Ser. No. 11/289,615 filed Nov. 30, 2005 to Jennifer L. Belelie et al., describes a radiation curable ink comprising curable monomer that is liquid at 25° C., curable wax, and colorant.

Commonly assigned, U.S. patent application Ser. No. 11/289,552 filed Nov. 30, 2005 to Jennifer L. Belelie et al., describes an ink jettable overprint composition, comprising: at least one of a polymerizable monomer and/or a polymerizable oligomer; at least one photoinitiator; and at least one wax.

Commonly assigned, U.S. patent application Ser. No. 11/289,620 filed Nov. 30, 2005 to Peter G. Odell et al., describes a phase change ink having a viscosity of from about 4 mPa-s to about 50 mPa-s at a first temperature and having a viscosity of from 104 mPa-s to about 109 mPa-s at a second temperature, the second temperature being below the first temperature by at least 10° C., but by no more than 50° C.

Commonly assigned, U.S. patent application Ser. No. 11/289,375 filed Nov. 30, 2005 to Daryl W. Vanbesien et al., describes a toner composition comprising toner particles, the toner particles comprising: (i) polymer comprising photoinitiator and (ii) unsaturated curable resin.

Commonly assigned, U.S. patent application Ser. No. 11/289,473 filed Nov. 30, 2005 to Rina Carlini et al., describes a radiation curable phase change ink comprising an ink vehicle that includes at least one gellant comprising a curable epoxy-polyamide composite gellant and at least one colorant.

Other curable inks that that are described to achieve more robust images following curing have also been described. Reference is made to the following patent properties: (1) Co-pending application Ser. No. 11/034,850 filed Jan. 14, 2005; (2) Co-pending application Ser. No. 11/034,856 filed Jan. 14, 2005; (3) Co-pending application Ser. No. 11/034,714 filed Jan. 14, 2005; (4) Co-pending application Ser. No. 11/018,378 filed Dec. 22, 2004; and (5) Co-pending application Ser. No. 11/034,866 filed Jan. 14, 2005.

The appropriate components and process aspects of each of the foregoing, such as the ink composition components and imaging processes, may be selected for the present disclosure in embodiments thereof. The entire disclosures of the above-mentioned applications are totally incorporated herein by reference.

REFERENCES

U.S. Pat. Nos. 5,804,671, 5,889,076, 6,239,189 and 6,316,517, as well as U.S. Publication No. 2003/0036587, each disclose compositions including rheology modifying agents therein. U.S. Pat. No. 5,804,671 and U.S. Pat. No. 5,889,076 describe a composition that is useful in the preparation of radiation curable coatings and comprising the reaction product of an epoxy component and an acid component comprised of an ethylenically unsaturated carboxylic acid or reactive derivative thereof, reacted in the presence of, or post-reaction blended with, a polyamide based on a polymerized fatty acid and having a number average molecular weight of less than about 10,000 g/mole. U.S. Pat. No. 6,239,189 describes a radiation-polymerizable composition that may be including in a printing ink, the composition containing at least one curable acrylate resin oligomer prepared by reacting an alkoxylated polyol with a first acid component which includes an ethylenically unsaturated carboxylic acid, and a rheology modifier prepared by reacting a diepoxide with a second acid component which includes an ethylenically unsaturated carboxylic acid or reactive derivative thereof in the presence of a polyamide based on a polymerized fatty acid. Ink jet inks and/or phase change inks are not described, and in fact it is believed that the viscosities of the inks described in this reference would be so large that such inks could not be jetted. U.S. Pat. No. 6,316,517 describes radiation-polymerizable compositions that are especially useful as or in a flush vehicle for making flushed pigments. The compositions contain at least one radiation-curable acrylated resin component and a copolymerizable rheology modifier component. In particular, the flushed pigment comprises a pigment and a flushing vehicle, the flushing vehicle comprising a substantially homogenous admixture of two or more curable acrylated resins selected from the group consisting of acrylated epoxies, acrylated urethanes and acrylated polyesters, and a rheology modifying resin copolymerizable with curable acrylate resin when subjected to radiation in the presence of a photoinitiator, for example the reaction product of (i) an epoxy component, (ii) an ethylenically unsaturated carboxylic acid or reactive derivative thereof and (iii) a fatty acid or reactive derivative thereof, said components (i), (ii) and (iii) being reacted in the presence of a polyamide based on a polymerized fatty acid. U.S. Publication No. 2003/0036587 describes a rheology controlled epoxy composition capable for use in bonding a silicon substrate to a flex circuit or a flex circuit to a pen body, comprising: (a) an epoxy resin component; (b) a rheology control agent selected from the group consisting of epoxysilanes, aminosilanes, trialkoxysilyl isocyanurate derivatives, and combinations thereof; (c) a curing agent component comprising a member selected from the group consisting of amine compounds, amide compounds, imidazole compounds, and combinations thereof; and (d) optionally, an inorganic filler component.

U.S. Pat. No. 6,586,492 describes an ink-jet ink comprising an ink jet vehicle and a colorant, the vehicle comprising at least 35% by weight, based on the total vehicle weight, of a radiation curable material and further comprising a thickener, said vehicle being a thixotropic paste at 20° C., and said vehicle having a viscosity of less than 25 centipoise at least at one temperature in the range of from 40° C. to 130° C.

U.S. Pat. No. 5,892,116 and PCT Patent Publication WO 97/24364, the disclosures of each of which are totally incorporated herein by reference, disclose gellants that gel a variety of nonpolar and polar liquids. Moreover, gelation of various monomers with subsequent polymerization of the gelled monomers forms organic zeolites and membrane materials.

The disclosures of each of the foregoing patents and publications are hereby incorporated by reference herein in their entireties. The appropriate components and process aspects of the each of the foregoing patents and publications may also be selected for the present compositions and processes in embodiments thereof.

BACKGROUND

Ink jetting devices are known in the art, and thus extensive description of such devices is not required herein. As described in U.S. Pat. No. 6,547,380, incorporated herein by reference, ink jet printing systems are generally of two types: continuous stream and drop-on-demand. In continuous stream ink jet systems, ink is emitted in a continuous stream under pressure through at least one orifice or nozzle. The stream is perturbed, causing it to break up into droplets at a fixed distance from the orifice. At the break-up point, the droplets are charged in accordance with digital data signals and passed through an electrostatic field that adjusts the trajectory of each droplet in order to direct it to a gutter for recirculation or a specific location on a recording medium. In drop-on-demand systems, a droplet is expelled from an orifice directly to a position on a recording medium in accordance with digital data signals. A droplet is not formed or expelled unless it is to be placed on the recording medium.

There are three types of drop-on-demand ink jet systems. One type of drop-on-demand system is a piezoelectric device that has as its major components an ink filled channel or passageway having a nozzle on one end and a piezoelectric transducer near the other end to produce pressure pulses. Another type of drop-on-demand system is known as acoustic ink printing. As is known, an acoustic beam exerts a radiation pressure against objects upon which it impinges. Thus, when an acoustic beam impinges on a free surface (i.e., liquid/air interface) of a pool of liquid from beneath, the radiation pressure which it exerts against the surface of the pool may reach a sufficiently high level to release individual droplets of liquid from the pool, despite the restraining force of surface tension. Focusing the beam on or near the surface of the pool intensifies the radiation pressure it exerts for a given amount of input power. Still another type of drop-on-demand system is known as thermal ink jet, or bubble jet, and produces high velocity droplets. The major components of this type of drop-on-demand system are an ink filled channel having a nozzle on one end and a heat generating resistor near the nozzle. Printing signals representing digital information originate an electric current pulse in a resistive layer within each ink passageway near the orifice or nozzle, causing the ink vehicle (usually water) in the immediate vicinity to vaporize almost instantaneously and create a bubble. The ink at the orifice is forced out as a propelled droplet as the bubble expands.

In a typical design of a piezoelectric ink jet device, the image is applied by jetting appropriately colored inks during four to six Notations (incremental movements) of a substrate (an image receiving member or intermediate transfer member) with respect to the ink jetting head, i.e., there is a small translation of the printhead with respect to the substrate in between each rotation. This approach simplifies the printhead design, and the small movements ensure good droplet registration. At the jet operating temperature, droplets of liquid ink are ejected from the printing device and, when the ink droplets contact the surface of the recording substrate, either directly or via an intermediate heated transfer belt or drum, they quickly solidify to form a predetermined pattern of solidified ink drops.

Hot melt inks typically used with ink jet printers have a wax based ink vehicle, e.g., a crystalline wax. Such solid ink jet inks provide vivid color images. In typical systems, these crystalline wax inks partially cool on an intermediate transfer member and are then pressed into the image receiving medium such as paper. Transfuse spreads the image droplet, providing a richer color and lower pile height. The low flow of the solid ink also prevents show through on the paper.

In these systems, the crystalline wax inks are jetted onto a transfer member, for example, an aluminum drum, at temperatures of approximately 130-140° C. The wax based inks are heated to such high temperatures to decrease their viscosity for efficient and proper jetting onto the transfer member. The transfer member is at approximately 60° C., so that the wax will cool sufficiently to solidify or crystallize. As the transfer member rolls over the recording medium, e.g., paper, the image comprised of wax based ink is pressed into the paper.

However, the use of crystalline waxes places limitations on the printing process. First, the printhead must be kept at about 130° C. during the print process. Moreover, when the printhead is cooled and re-warmed, the resulting contraction and expansion of the ink requires a purge cycle to achieve optimum printhead performance. Furthermore, increased mechanical robustness is desired.

While known compositions and processes are suitable for their intended purposes, a need remains for improvements in radiation curable inks, for example with respect to jetting temperatures, fusing latitude, and image quality, including low gloss image properties.

For example, conventional UV-curable inks generally provide very high gloss images. These high gloss images are very attractive in pictorial applications and on high gloss substrates. However, market experience shows that some users prefer matte or lower gloss images, such as for text and highlight color applications, and especially on low gloss substrates. UV curable inks and films tend to have high gloss values, such as about 80 ggu (Gardner Gloss Units) or higher, as measured at 75° by the GARDNER® gloss unit. However, many business applications require or prefer a lower gloss value, such as about 20 to about 50 ggu (Gardner Gloss Units). See, for example, Dalal & Swanton, TAGA Proceedings 1996, pp. 195-205 (1996).

Standard gloss reduction techniques include incorporation of particles of silica or alumina, and complex illumination schemes to selectively cure different film depths. However, such approaches are not suitable for high speed ink jet processes, as the particle size (about 25 microns) is generally too large and the resultant film is generally too thin to effectively use a dual cure scheme to generate surface irregularities and reduce gloss.

SUMMARY

These and other improvements are accomplished by the radiation curable phase change inks described herein, and processes of forming images with such inks.

In embodiments, the radiation curable phase change ink is comprised of a curable wax component such as a curable waxy acrylate, at least one colorant and at least one initiator. The ink may also include additional curable monomers, oligomers or polymers in the ink vehicle.

That is, in embodiments, the radiation curable phase change ink, such as used in piezoelectric ink jet devices, includes a radiation curable phase change ink vehicle that includes at least one curable monomer or oligomer, at least one curable wax such as a waxy acrylate, at least one initiator, and at least one colorant. The use of the curable wax such as a waxy acrylate enables the ink to provide a lower gloss image than would otherwise be provided, such as having a gloss value of about 20 to about 60 ggu, rather than a gloss value of about 70 to about 90 ggu.

In embodiments of forming an image with the ink, the ink is heated to a first temperature at which the ink may be jetted, then jetted onto paper or other media, such as boxboard, cardboard, plastic and fabric, maintained at a second temperature at which the ink forms a gel state, and subsequently exposed to radiation energy to initiate the curing/polymerization of curable components of the ink.

In an embodiment, the present disclosure provides a radiation curable ink comprising:

a curable monomer or oligomer;

a curable wax;

a colorant; and at least one initiator.

In another embodiment, the present disclosure provides a method for forming an image, said method comprising:

applying the radiation curable ink to a substrate in an imagewise manner; and exposing the radiation curable ink to radiation to cure the ink.

EMBODIMENTS

The composition of the present disclosure is a curable ink, such as a radiation (such as UV-light) curable ink. In embodiments, the radiation curable ink comprises a curable monomer or oligomer, such as one that is liquid at 25° C., a curable wax, such as a curable waxy acrylate, and a colorant in embodiments, the composition of the present disclosure can also include a gellant, and other optional additives.

The term "curable" refers, for example, to the component or combination being polymerizable, that is, a material that may be cured via polymerization, including for example free radical routes, and/or in which polymerization is photoinitiated though use of a radiation sensitive photoinitiator.

Thus, for example, the term "radiation curable" refers is intended to cover all forms of curing upon exposure to a radiation source, including light and heat sources and including in the presence or absence of initiators. Example radiation curing routes include, but are not limited to, curing using ultraviolet (UV) light, for example having a wavelength of 200-400 nm or more rarely visible light, such as in the presence of photoinitiators and/or sensitizers, curing using e-beam radiation, such as in the absence of photoinitiators, curing using thermal curing, in the presence or absence of high temperature thermal initiators (and which are generally largely inactive at the jetting temperature), and appropriate combinations thereof.

In the uncured state, the composition in embodiments is a low viscous liquid and is readily jettable. Upon exposure to a suitable source of curing energy, e.g., ultraviolet light, electron beam energy, or the like, the rhotoinitiator absorbs the energy and sets into motion a reaction that converts the liquid composition into a cured material. The monomer and/or oligomer in the composition contain functional groups that polymerize during exposure to the curing source to readily crosslink forming a polymer network. This polymer network provides printed image with, for example, durability, thermal and light stability, and scratch and smear resistance. Thus, the composition is particularly well-suited for ink-based images printed on substrates that may be subjected to heat or sunlight, because the composition provides a printed image that is resistant to cracking and fading and provides image permanence. The composition also includes a wax that reduces the image gloss, providing a less glossy or more matte image.

Suitable radiation, such as UV, curable monomers and oligomers include, but are not limited to, acrylated esters, acrylated polyesters, acrylated ethers, acrylated polyethers, acrylated epoxies, urethane acrylates, and pentaerythritol tetraacrylate. Specific examples of suitable acrylated oligomers include, but are not limited to, acrylated polyester oligomers, such as CN2262 (Sartomer Co.), EB 812 (Cytec Surface Specialties), EB 810 (Cytec Surface Specialties), CN2200 (Sartomer Co.), CN2300 (Sartomer Co.), and the like, acrylated urethane oligomers, such as EB270 (UCB Chemicals), EB 5129 (Cytec Surface Specialties), CN2920 (Sartomer Co.), CN3211 (Sartomer Co.), and the like, and acrylated epoxy oligomers, such as EB 600 (Cytec Surface Specialties), EB 3411 (Cytec Surface Specialties), CN2204 (Sartomer Co.), CN110 (Sartomer Co.), and the like; and pentaerythritol tetraacrylate oligomers, such as SR399LV (Sartomer Co.) and the like. Specific examples of suitable acrylated monomers include, but are not limited to, polyacrylates, such as trimethylol propane triacrylate, pentaerythritol tetraacrylate, pentaerythritol triacrylate, dipentaerythritol pentaacrylate, glycerol propoxy triacrylate, tris(2-hydroxyethyl) isocyanurate triacrylate, pentaacrylate ester, and the like, epoxy acrylates, urethane acrylates, amine acrylates, acrylic acrylates, and the like. Mixtures of two or more materials can also be employed as the reactive monomer. Suitable reactive monomers are commercially available from, for example, Sartomer Co., Inc., Henkel Corp., Radcure Specialties, and the like.

In embodiments, the at least one radiation curable oligomer and/or monomer can be cationically curable, radically curable, or the like.

The radiation curable monomer or oligomer variously functions as a viscosity reducer, as a binder when the composition is cured, as an adhesion promoter, and as a crosslinking agent, for example. Suitable monomers can have a low molecular weight, low viscosity, and low surface tension and comprise functional groups that undergo polymerization upon exposure to radiation such as UV light.

In embodiments, the monomer is equipped with one or more curable moieties, including, but not limited to, acrylates; methacrylates; alkenes; allylic ethers; vinyl ethers; epoxides, such as cycloaliphatic epoxides, aliphatic epoxides, and glycidyl epoxides; oxetanes; and the like. Examples of suitable monomers include monoacrylates, diacrylates, and polyfunctional alkoxylated or polyalkoxylated acrylic monomers comprising one or more di- or tri-acrylates. Suitable monoacrylates are, for example, cyclohexyl acrylate, 2-ethoxy ethyl acrylate, 2-methoxy ethyl acrylate, 2(2-ethoxyethoxy) ethyl acrylate, stearyl acrylate, tetrahydrofurfuryl acrylate, octyl acrylate, lauryl acrylate, behenyl acrylate, 2-phenoxy ethyl acrylate, tertiary butyl acrylate, glycidyl acrylate, isodecyl acrylate, benzyl acrylate, hexyl acrylate, isooctyl acrylate, isobornyl acrylate, butanediol monoacrylate, ethoxylated phenol monoacrylate, oxyethylated phenol acrylate, monomethoxy hexanediol acrylate, beta-carboxy ethyl acrylate, dicyclopentyl acrylate, carbonyl acrylate, octyl decyl acrylate, ethoxylated nonylphenol acrylate, hydroxyethyl acrylate, hydroxyethyl methacrylate, and the like. Suitable polyfunctional alkoxylated or polyalkoxylated acrylates are, for example, alkoxylated, such as ethoxylated or propoxylated, variants of the following: neopentyl glycol diacrylates, butanediol diacrylates, trimethylolpropane triacrylates, glyceryl triacrylates, 1,3-butylene glycol diacrylate, 1,4-butanediol diacrylate, diethylene glycol diacrylate, 1,6-hexanediol diacrylate, tetraethylene glycol diacrylate, triethylene glycol diacrylate, tripropylene glycol diacrylate, polybutanediol diacrylate, polyethylene glycol diacrylate, propoxylated neopentyl glycol diacrylate, ethoxylated neopentyl glycol diacrylate, polybutadiene diacrylate, and the like. In embodiments, one suitable monomer is a propoxylated neopentyl glycol diacrylate, such as, for example, SR-9003 (Sartomer Co., Inc., Exton, Pa.), having the structure:

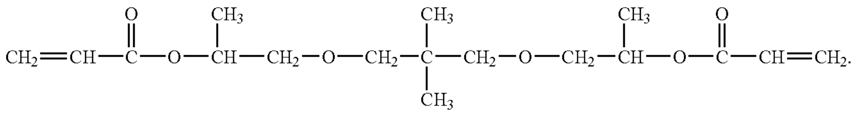

Other suitable reactive monomers are likewise commercially available from, for example, Sartomer Co., Inc., Henkel Corp., Radcure Specialties, and the like.

In embodiments, the ink composition includes at least one reactive monomer and/or oligomer. However, other embodiments can include only one or more reactive oligomers, only one or more reactive monomers, or a combination of one or more reactive oligomers and one or more reactive monomers, However, in embodiments, the composition includes at least one reactive (curable) monomer, and optionally one or more additional reactive (curable) monomers and/or one or more reactive (curable) oligomers.

The curable monomer or oligomer in embodiments is included in the ink in an amount of, for example, about 20 to about 90% by weight of the ink, such as about 30 to about 85% by weight of the ink, or about 40 to about 80% by weight of the ink. In embodiments, the curable monomer or oligomer has a viscosity at 25° C. of about 1 to about 50 cP, such as about 1 to about 40 cP or about 10 to about 30 cP. In one embodiment, the curable monomer or oligomer has a viscosity at 25° C. of about 20 cP. Also, in some embodiments, it is desired that the curable monomer or oligomer is not a skin irritant, so that printed images using the ink compositions are not irritable to users.

The curable wax may be any wax component that is miscible with the other components and that will polymerize with the curable monomer or oligomer to form a polymer. The term "wax" includes, for example, any of the various natural, modified natural, and synthetic materials commonly referred to as waxes. A wax is solid at room temperature, specifically at 25° C. Inclusion of the wax promotes an increase in viscosity of the ink as it cools from the jetting temperature. The wax also acts to lower the gloss of the resultant image from a value that would otherwise be provided in the absence of the curable wax. The curable wax thus provides a more matte or less glossy image.

Suitable examples of curable waxes include, but are not limited to, those waxes that include or are functionalized with curable groups. The curable groups may include, for example, acrylate, methacrylate, alkene, allylic ether, epoxide, oxetane, and the like. These waxes can be synthesized by the reaction of a wax equipped with a transformable functional group, such as carboxylic acid or hydroxyl.

Suitable examples of hydroxyl-terminated polyethylene waxes that may be functionalized with a curable group include, but are not limited to, mixtures of carbon chains with the structure $CH_3-(CH_2)_n-CH_2OH$, where there is a mixture of chain lengths, n, where the average chain length can be in the range of about 16 to about 50, and linear low molecular weight polyethylene, of similar average chain length. Suitable examples of such waxes include, but are not limited to, the UNILIN® series of materials such as UNILIN® 350, UNILIN® 425, UNILIN® 550 and UNILIN® 700 with $M_n$ approximately equal to 375, 460, 550 and 700 g/mol, respectively. All of these waxes are commercially available from Baker-Petrolite. Guerbet alcohols, characterized as 2,2-dialkyl-1-ethanols, are also suitable compounds. Exemplary Guerbet alcohols include those containing about 16 to about 36 carbons, many of which are commercially available from Jarchem Industries Inc., Newark, N.J. PRIPOL® 2033 (C-36 dimer diol mixture including isomers of the formula

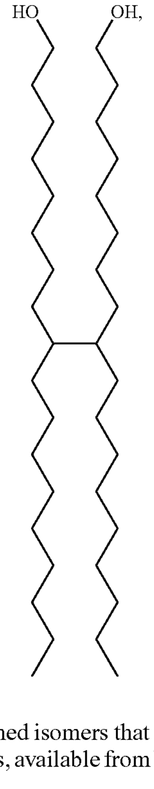

as well as other branched isomers that may include unsaturations and cyclic groups, available from Uniqema, New Castle, Del.; further information on $C_{36}$ dimer diols of this type is disclosed in, for example, "Dimer Acids," *Kirk-Othmer Encyclopedia of Chemical Technology*, Vol. 8, 4$^{th}$ Ed. (1992), pp. 223 to 237, the disclosure of which is totally incorporated herein by reference) can also be used. These alcohols can be reacted with carboxylic acids equipped with UV curable moieties to form reactive esters. Examples of these acids include acrylic and methacrylic acids, available from Sigma-Aldrich Co. In embodiments, suitable curable monomers include waxy acrylates, such as acrylates of UNILIN® 350, UNILIN® 425, UNILIN® 550 and UNILIN® 700.

Suitable examples of carboxylic acid-terminated polyethylene waxes that may be functionalized with a curable group include mixtures of carbon chains with the structure $CH_3$—$(CH_2)_n$—COOH, where there is a mixture of chain lengths, n, where the average chain length is about 16 to about 50, and linear low molecular weight polyethylene, of similar average chain length. Suitable examples of such waxes include, but are not limited to, UNICID® 350, UNICID® 425, UNICID® 550 and UNICID® 700 with $M_n$ equal to approximately 390, 475, 565 and 720 g/mol, respectively. Other suitable waxes have a structure $CH_3$—$(CH_2)_n$—COOH, such as hexadecanoic or palmitic acid with n=14, heptadecanoic or margaric or daturic acid with n=15, octadecanoic or stearic acid with n=16, eicosanoic or arachidic acid with n=18, docosanoic or behenic acid with n=20, tetracosanoic or lignoceric acid with n=22, hexacosanoic or cerotic acid with n=24, heptacosanoic or carboceric acid with n=25, octacosanoic or montanic acid with n=26, triacontanoic or melissic acid with n=28, dotriacontanoic or lacceroic acid with n=30, tritriacontanoic or ceromelissic or psyllic acid, with n=31, tetratriacontanoic or geddic acid with n=32, pentatriacontanoic or ceroplastic acid with n=33. Guerbet acids, characterized as 2,2-dialkyl ethanoic acids, are also suitable compounds. Exemplary Guerbet acids include those containing 16 to 36 carbons, many of which are commercially available from Jarchem Industries Inc., Newark, N.J. PRIPOL® 1009 (C-36 dimer acid mixture including isomers of the formula

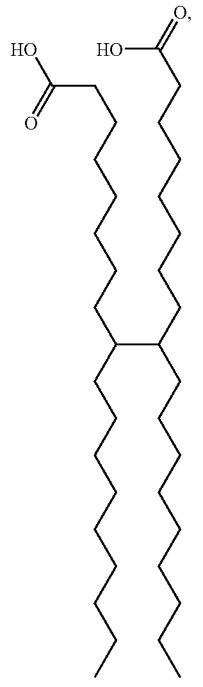

as well as other branched isomers that may include unsaturations and cyclic groups, available from Uniqema, New Castle, Del.; further information on $C_{36}$ dimer acids of this type is disclosed in, for example, "Dimer Acids," *Kirk-Othmer Encyclopedia of Chemical Technology*, Vol. 8, 4$^{th}$ Ed. (1992), pp. 223 to 237, the disclosure of which is totally incorporated herein by reference) can also be used. These carboxylic acids can be reacted with alcohols equipped with UV curable moieties to foam reactive esters. Examples of these alcohols include, but are not limited to, 2-allyloxyethanol from Sigma-Aldrich Co.;

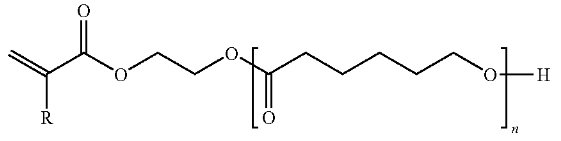

TONE M-101 (R═H, $n_{avg}$=1), TONE M-100 (R═H, $n_{avg}$=2) and TONE M-201 (R=Me, $n_{avg}$=1) from The Dow Chemical Company; and

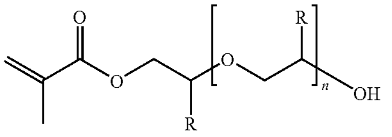

CD572 (R═H, n=10) and SR604 (R=Me, n=4) from Sartomer Company, Inc.

The curable wax can be included in the ink composition in an amount of from, for example, about 1 to about 25% by weight of the ink, such as about 2 or about 5 to about 10 or about 15% by weight of the ink. In an embodiment, the curable wax can be included in the ink composition in an amount of from about 6 to about 10% by weight of the ink, such as about 8 to about 9% by weight of the ink.

Any desired or effective colorant can be employed in the inks, including pigment, dye, mixtures of pigment and dye, mixtures of pigments, mixtures of dyes, and the like, provided that the colorant can be dissolved or dispersed in the ink vehicle. The compositions can be used in combination with conventional ink colorant materials, such as Color Index (C.I.) Solvent Dyes, Disperse Dyes, modified Acid and Direct Dyes, Basic Dyes, Sulphur Dyes, Vat Dyes, and the like.

Examples of suitable dyes include Eastman olefin, Usharect Blue 86 (Direct Blue 86), available from Ushanti Color; Intralite Turquoise 8GL (Direct Blue 86), available from Classic Dyestuffs; Chemactive Brilliant Red 7BH (Reactive Red 4), available from Chemiequip; Levafix Black EB, available from Bayer; Reactron Red H8B (Reactive Red 31), available from Atlas Dye-Chem; D&C Red #28 (Acid Red 92), available from Wamer-Jenkinson; Direct Brilliant Pink B, available from Global Colors; Acid Tartrazine, available from Metrochem Industries; Cartasol Yellow 6GF Clariant; Carta Blue 2GL, available from Clariant; and the like. Particularly suitable are solvent dyes; within the class of solvent dyes, spirit soluble dyes are desired because of their compatibility with the ink vehicles of the present invention. Examples of suitable spirit solvent dyes include Neozapon Red 492 (BASF); Orasol Red G (Ciba); Direct Brilliant Pink B (Global Colors); Aizen Spilon Red C-BH (Hodogaya Chemical); Kayanol Red 3BL (Nippon Kayaku); Spirit Fast Yellow 3G;

Aizen Spilon Yellow C-GNH (Hodogaya Chemical); Cartasol Brilliant Yellow 4GF (Clariant); Pergasol Yellow CGP (Ciba); Orasol Black RLP (Ciba); Savinyl Black RLS (Clariant); Morfast Black Conc. A (Rohm and Haas); Orasol Blue GN (Ciba); Savinyl Blue GLS (Sandoz); Luxol Fast Blue MBSN (Pylam); Sevron Blue 5GMF (Classic Dyestuffs); Basacid Blue 750 (BASF), and the like. Neozapon Black X51 [C.I. Solvent Black, C.I. 12195] (BASF), Sudan Blue 670 [C.I. 61554] (BASF), Sudan Yellow 146 [C.I. 12700] (BASF), and Sudan Red 462 [C.I. 260501] (BASF) are particularly suitable in embodiments.

Pigments are also suitable colorants for the inks. Examples of suitable pigments include Violet PALIOGEN Violet 5100 (BASF); PALIOGEN Violet 5890 (BASF); HELIOGEN Green L8730 (BASF); LITHOL Scarlet D3700 (BASF); Sunfast® Blue 15:4 (Sun Chemical 249-0592); Hostaperm Blue 132G-D (Clariant); Permanent Red P-F7RK; Hostaperm Violet BL (Clariant); LITHOL Scarlet 4440 (BASF); Bon Red C (Dominion Color Company); ORACET Pink RF (Ciba); PALIOGEN Red 3871 K (BASF); Sunfast® Blue 15:3 (Sun Chemical 249-1284), PALIOGEN Red 3340 (BASF); Sunfast® Carbazole Violet 23 (Sun Chemical 246-1670); LITHOL Fast Scarlet L4300 (BASF); Sunbrite Yellow 17 (Sun Chemical 275-0023); HELIOGEN Blue L6900, L7020 (BASF); Sunbrite Yellow 74 (Sun Chemical 272-0558); Spectra Pac® C Orange 16 (Sun Chemical 276-3016); HELIOGEN Blue K6902, K6910 (BASF); Sunfast® Magenta 122 (Sun Chemical 228-0013); HELIOGEN Blue D6840, D7080 (BASF); Sudan Blue OS (BASF); NEOPEN Blue FF4012 (BASF); PV Fast Blue, B2GO1 (Clariant); IRGALITE Blue BCA (Ciba); PALIOGEN Blue 6470 (BASF); Sudan Orange G (Aldrich), Sudan Orange 220 (BASF); PALIOGEN Orange 3040 (BASF); PALIOGEN Yellow 152, 1560 (BASF); LITHOL Fast Yellow 0991 K (BASF); PALIOTOL Yellow 1840 (BASF); NOVOPERM Yellow FGL (Clariant); Lumogen Yellow D0790 (BASF); Suco-Yellow L1250 (BASF); Suco-Yellow D1355 (BASF); Suco Fast Yellow DI 355, DI 351 (BASF); HOSTAPERM Pink E 02 (Clariant); Hansa Brilliant Yellow 5GX03 (Clariant); Permanent Yellow GRL 02 (Clariant); Permanent Rubine L6B 05 (Clariant); FANAL Pink D4830 (BASF); CINQUASIA Magenta (DU PONT), PALIOGEN Black L0084 (BASF); Pigment Black K801 (BASF); and carbon blacks such as REGAL 330™. (Cabot), Carbon Black 5250, Carbon Black 5750 (Columbia Chemical), mixtures thereof and the like.

The colorant can be included in the ink in any suitable amount, such as an amount of from about 0.1 to about 15% by weight of the ink, such as about 0.5 or about 1 to about 8 or about 10% by weight of the ink.

In embodiments, the composition further comprises an initiator, such as a photoinitiator, that initiates polymerization of curable components of the ink, including the curable monomer and the curable wax. The initiator should be soluble in the composition. In embodiments, the initiator is a UV-activated photoinitiator.

In embodiments, the initiator can be a radical initiator. Examples of suitable radical photoinitiators include ketones such as hydroxycyclohexylphenyl ketones, benzyl ketones, monomeric hydroxyl ketones, polymeric hydroxyl ketones, α-amino ketones, and 4-(2-hydroxyethoxy)phenyl-(2-hydroxy-2-propyl) ketone; benzoins; benzoin alkyl ethers; acyl phosphine oxides, metallocenes, benzophenones, such as 2,4,6-trimethylbenzophenone and 4-methylbenzophenone; trimethylbenzoylphenylphosphine oxides such as 2,4,6-trimethylbenzoyl-diphenyl-phosphine oxide; azo compounds; anthraquinones and substituted anthraquinones, such as, for example, alkyl substituted or halo substituted anthraquinones; other substituted or unsubstituted polynuclear quinines; acetophenones, thioxanthones; ketals; acylphosphines; thioxanthenones, such as 2-isopropyl-9H-thioxanthen-9-one; mixtures thereof; and the like. One suitable ketone is 1-[4-(2-hydroxyethoxy)-phenyl]-2-hydroxy-2-methyl-1-propane-1-one. In an embodiment, the ink contains an α-amino ketone, 1-[4-(2-hydroxyethoxy)-phenyl]-2-hydroxy-2-methyl-1-propane-1-one and 2-isopropyl-9H-thioxanthen-9-one. In another embodiment, the photoinitiator is one of the following compounds or a mixture thereof: a hydroxycyclohexylphenyl ketone, such as, for example, 1-hydroxycyclohexylphenyl ketone, such as, for example, Irgacure® 184 (Ciba-Geigy Corp., Tarrytown, N.Y.), having the structure:

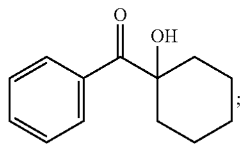

a trimethylbenzoylphenylphosrhine oxide, such as, for example, ethyl-2,4,6-trimethylbenzoylphenylphosphinate, such as, for example, Lucirin® TPO-L (BASF Corp.), having the formula

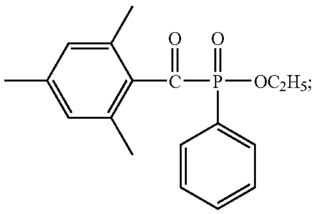

a mixture of 2,4,6-trimethylbenzophenone and 4-methylbenzophenone, such as, for example, SARCURE™ SR1137 (Sartomer); a mixture of 2,4,6-trimethylbenzoyl-diphenyl-phosphine oxide and 2-hydroxy-2-methyl-1-phenyl-propan-1-one, such as, for example, DAROCUR® 4265 (Ciba Specialty Chemicals); alpha-amino ketone, such as, for example, IRGACURE® 379 (Ciba Specialty Chemicals); 4-(2-hydroxyethoxy)phenyl-(2-hydroxy-2-ipropyl) ketone, such as, for example, IRGACURE® 2959 (Ciba Specialty Chemicals); 2-isopropyl-9H-thioxanthen-9-one, such as, for example, DAROCUR® ITX (Ciba Specialty Chemicals); and mixtures thereof.

In other embodiments, the initiator car be a cationic initiator. Examples of suitable cationic photoinitiators include aryldiazonium salts, diaryliodonium salts, triarylsulfonium salts, triarylselenonium salts, dialkylphnacylsulfonium salts, triarylsulphoxonium salts and aryloxydiarylsulfonium salts.

The total amount of initiator included in the ink may be, for example, about 0.5 to about 15%, such as about 1 to about 10%, by weight of the ink.

The ink may contain optional additives. Optional additives include, but are not limited to, surfactants, light stabilizers, UV absorbers, which absorb incident UV radiation and convert it to heat energy that is ultimately dissipated, antioxidants, optical brighteners, which can improve the appearance of the image and mask yellowing, thixotropic agents, dewetting agents, slip agents, foaming agents, antifoaming agents, flow agents, other non-curable waxes, oils, plasticizers, binders, electrical conductive agents, fungicides, bactericides, organic and/or inorganic filler particles, leveling agents, e.g., agents that create or reduce different gloss levels, opacifiers, antistatic agents, dispersants, and the like. In particular, the composition may include, as a stabilizer, a radical scavenger, such as frgastab UV 10 (Ciba Specialty Chemicals, Inc.). The composition may also include an inhibitor, such as a hydroquinone, to stabilize the composition by prohibiting or, at least, delaying, polymerization of the oligomer and monomer components during storage, thus increasing the shelf life of the composition. However, additives may negatively affect cure rate, and thus care must be taken when formulating a composition using optional additives.

The total amount of other additives included in the ink may be, for example, about 0.5 to about 15%, such as about 1 to about 10%, by weight of the ink.

The ink may also optionally contain at least one gellant. The gellant can be included, for example, to control the viscosity of the ink composition before and/or after jetting. For example, suitable gellants include a curable gellant comprised of a curable polyamide-epoxy acrylate component and a polyamide component, a curable composite gellant comprised of a curable epoxy resin and a polyamide resin, and the like.

Suitable curable composite gellant comprised of a curable epoxy resin and a polyamide resin are disclosed, for example, in commonly assigned, U.S. patent application Ser. No. 11/289,473 filed Nov. 30, 2005 to Rina Carlini et al., the entire disclosure of which is incorporated herein by reference. The epoxy resin component in the composite gellant can be any suitable epoxy group-containing material. In embodiments, the epoxy resin component is selected from among the diglycidyl ethers of either polyphenol-based epoxy resin or a polyol-based epoxy resin, or mixtures thereof. That is, in embodiments, the epoxy resins have two epoxy functional groups that are located at the terminal ends of the molecule. The polyphenol-based epoxy resin in embodiments is a bisphenol A-co-epichlorohydrin resin with not more than two glycidyl ether terminal groups. The polyol-based epoxy resin can be a dipropylene glycol-co-epichlorohydrin resin with not more than two glycidyl ether terminal groups. Suitable epoxy resins have a weight average molecular weight in the range of about 200 to about 800, such as about 300 to about 700. Commercially available sources of the epoxy resins are, for example, the bisphenol-A based epoxy resins from Dow Chemical Corp. such as DER 383, or the dipropyleneglycol-based resins from Dow Chemical Corp. such as DER 736. Other sources of epoxy-based materials originating from natural sources may be used, such as epoxidized triglyceride fatty esters of vegetable or animal origins, for example epoxidized linseed oil, rapeseed oil and the like, or mixtures thereof. Epoxy compounds derived from vegetable oils such as the VIKOFLEX line of products from Arkema Inc., Philadelphia Pa. may also be used. Further, the epoxy resin component can contain at least one ethylenically unsaturated functional group that is curable via free-radical initiation and enables chemical bonding of the gellant to the cured ink vehicle. The epoxy resin component is thus functionalized with acrylate or (meth)acrylate, vinyl ether, allyl ether and the like, by chemical reaction with unsaturated carboxylic acids or other unsaturated reagents. For example, the terminal epoxide groups of the resin become ring-opened in this chemical reaction, and are converted to (meth)acrylate esters by esterification reaction with (meth)acrylic acid.

As the polyamide component of the epoxy-polyamide composite gellant, any suitable polyamide material may be used without limitation. In embodiments, the polyamide is comprised of a polyamide resin derived from a polymerized fatty acid such as those obtained from natural sources (for example, palm oil, rapeseed oil, castor oil, and the like, including mixtures thereof) or the commonly known hydrocarbon “dimer acid,” prepared from dimerized C-18 unsaturated acid feedstocks such as oleic acid, linoleic acid and the like, and a polyamine, such as a diamine (for example, alkylenediamines such as ethylenediamine, DYTEK® series diamines, poly(alkyleneoxy)diamines, and the like, or also copolymers of polyamides such as polyester-polyamides and polyether-polyamides. One or more polyamide resins may be used in the formation of the curable gellant. Commercially available sources of the polyamide resin include, for example, the VERSAMID series of polyamides available from Cognis Corporation (formerly Henkel Corp.), in particular VERSAMID 335, VERSAMID 338, VERSAMID 795 and VERSAMID 963, all of which have low molecular weights and low amine numbers. The SYLVAGEL® polyamide resins from Arizona Chemical Company, and variants thereof including polyether-polyamide resins may be employed. The composition of the SYLVAGEL® resins obtained from Arizona Chemical Company are disclosed in U.S. Pat. Nos. 6,492,458 and 6,399,713 and U.S. Patent Publication No. US 2003/0065084, which are totally incorporated herein by reference, and are described as polyalkyleneoxydiamine polyamides with the general formula,

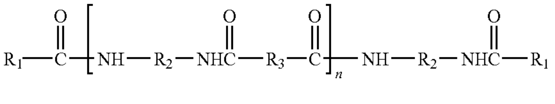

wherein $R_1$ is an alkyl group having at least seventeen carbons, $R_2$ includes a polyalkyleneoxide, $R_3$ includes a C-6 carbocyclic group, and n is an integer of at least 1.

Suitable curable gellants comprised of a curable polyamide-epoxy acrylate component and a polyamide component are disclosed, for example, in commonly assigned, U.S. patent application Ser. No. 11/289,609 filed Nov. 30, 2005 to Peter G. Odell et al., the entire disclosure of which is incorporated herein by reference. The curable polyamide-epoxy acrylate is curable by virtue of including at least one functional group therein. As an example, the polyamide-epoxy acrylate is difunctional. The functional group(s), such as the acrylate group(s), are radiation curable via free-radical initiation and enable chemical bonding of the gellant to the cured ink vehicle. A commercially available polyamide-epoxy acrylate is PHOTOMER® RM370 from Cognis. The curable polyamide-epoxy acrylate may also be selected from within the structures described above for the curable composite gellant comprised of a curable epoxy resin and a polyamide resin, disclosed, for example, in commonly assigned, U.S. patent application Ser. No. 11/289,473 filed Nov. 30, 2005 to Rina Carlini et al., the entire disclosure of which is incorporated herein by reference.

The polyamide resin component is a co-gellant, and is desirably included particularly for phase change inks that are intended for Lransfuse printing to an intermediate surface, since the viscoelastic properties in the inks are beneficial for this application. The polyamide co-gellant may increase the elastic nature of the gel state of the ink. That is, the value of the elastic modulus (G') is higher, which is desired when printing onto an intermediate transfer surface. When printing directly to paper, the requirement for higher elastic modulus (G') for the ink is reduced. Any suitable polyamide materials may be used for the polyamide component of the gellant, and exemplary materials are polyether-polyamides with low molecular weights that are, for example, in the range of from 1,000 to 5,000 grams per mole, but can also be outside of this range, and have low amine number such as in the range of from 0 to 10. Commercially available sources of polyamide resin include, for example, the SYLVAGEL® 1000 polyamide resin from Arizona Chemicals, and variants thereof.

The ink compositions can include the gellant in any suitable amount, such as about 1% to about 50% by weight of the ink. In embodiments, the gellant can be present in an amount of about 2% to about 20% by weight of the ink, such as about 5% to about 15% by weight of the ink, although the value can also be outside of this range.

In embodiments, the ink has a viscosity of from 8 mPa-s to 15 mPa-s, such as from 10 mPa-s to 12 mPa-s, at a temperature between 60° C. and 100° C. In embodiments, the ink has a viscosity of from $10^5$ to $10^7$ mPa-s at a temperature of 50° C. or below, specifically at a temperature from 0° C. to 50° C.

The inks described herein can be jetted at any suitable temperature. However, in embodiments, the inks are jetted at temperatures of less than about 110° C., such as about 40° C. to about 110° C., or about 65° C. to about 100° C. The inks are thus ideally suited for use in piezoelectric ink jet devices.

The inks described herein may be applied to a substrate to form an image. In embodiments, the method comprises providing a radiation curable ink described herein; applying the radiation curable ink to the substrate to form an image; and exposing the radiation curable ink to radiation to cure the ink. During the curing process, the curable monomer and the curable wax, optionally with other curable components, are polymerized to form a cured image.

The inks can be employed in apparatus for direct printing ink jet processes, wherein when droplets of the melted ink are ejected in an imagewise pattern onto a recording substrate, the recording substrate is a final recording substrate. Alternatively, the inks can be employed in indirect (offset) printing ink jet applications, wherein when droplets of the melted ink are ejected in an imagewise pattern onto a recording substrate, the recording substrate is an intermediate transfer member and the ink in the imagewise pattern is subsequently transferred from the intermediate transfer member to a final recording substrate.

The inks are suited for jetting onto an intermediate transfer substrate, e.g., an intermediate transfuse drum or belt. In a suitable design, the image may be applied by jetting appropriately colored inks during four to eighteen rotations (incremental movements) of the intermediate transfuse member with respect to the ink jetting head, i.e., there is a small translation of the printhead with respect to the substrate in between each rotation. This approach simplifies the printhead design, and the small movements ensure good droplet registration. Transfuse, i.e., a transfer and fusing step, is desirable in forming the image as transfuse enables a high quality image to be built up on a rapidly rotating transfer member. This approach simplifies the printhead design, while the small movements of the head ensure good droplet registration. Transfuse typically involves jetting the ink from the ink jet head onto an intermediate member such as a belt or drum, i.e., the transfuse member. This procedure allows the image to be rapidly built onto the transfuse member for subsequent transfer and fusing to an image receiving substrate.

The intermediate transfer member may take any suitable form, although in embodiments it can be a drum or belt. The member surface may be at room temperature, although in embodiments it is desirable to heat the member such that a surface temperature thereof is maintained within a narrow temperature range so as to control the viscosity characteristics of the inks over a wide range of environmental conditions. This temperature can be at or below the second temperature. In this way, the ink is maintained on the surface of the transfer member until transfer to the image receiving substrate.

Once upon the intermediate transfer member surface, the jetted ink may be exposed to radiation to a limited extent so as to effect a limited curing of the ink upon the intermediate member surface. This intermediate curing is not to cure the ink to its full extent, but merely to assist in setting the ink up so that it may be transferred to the image receiving substrate with the appropriate amount of penetration, which requires the ink droplets to have a certain rheology before transfer. For controlling the extent of the curing if an intermediate cure is practiced, reference is made to Co-pending application Ser. No. 11/034,850 filed Jan. 14, 2005, incorporated herein by reference. This intermediate curing step may not be needed since the phase change is generally sufficient to impart the desired rheology to the ink droplets.

Following jetting to the intermediate transfer member and optional intermediate curing thereon, the ink is thereafter transferred to an image receiving substrate. The substrate may be any suitable material such as paper, boxboard, cardboard, fabric, a transparency, plastic, glass, wood etc., although the ink is desirably used in forming images on paper. Following transfer to the substrate, the image on the substrate is exposed to radiation having an appropriate wavelength, mainly the wavelength at which the ink initiator absorbs radiation, to initiate the curing reaction of the ink. The radiation exposure need not be long, and may be for, e.g., about 0.05 to about 10 seconds, more such as about 0.2 to about 5 seconds. These exposure times are more often expressed as substrate speeds of the ink passing under a UV lamp. For example, the microwave energized, doped mercury bulbs available from UV Fusion (Gaithersburg, Md.) are placed in an elliptical mirror assembly that is 10 cm wide; multiple units may be placed in series. Thus, a belt speed of 0.1 $ms^{-1}$ would require 1 second for a point of an image to pass under a single unit, while a belt speed 4.0 $ms^{-1}$ would require 0.2 s to pass under four bulb assemblies. The radiation to cure the polymerizable components of the ink can, for example, be provided by a variety of possible techniques, including but not limited to a xenon lamp, laser light, D or H bulb, etc. The curing light may be filtered, if desired or necessary. The curable components of the ink react to form a cured or crosslinked network of appropriate hardness. In embodiments, the curing is substantially complete, i.e., at least 75% of the curable components are cured (polymerized and/or crosslinked), to allow the ink to be substantially hardened, and thereby to be much more scratch resistant, and also to adequately control the amount of showthrough on the substrate.

When an indirect printing process is used, the intermediate transfer member can be of any desired or suitable configuration, such as a drum or roller, a belt or web, a flat surface or platen, or the like. The intermediate transfer member can be heated by any desired or suitable method, such as by situating heaters in or near the intermediate transfer member, or the like. The intermediate transfer member may also be cooled by situating fans nearby or heat exchange with a cooled fluid. Optionally, a layer of a sacrificial liquid can be applied to the intermediate transfer member prior to ejecting the droplets of melted ink onto the intermediate transfer member, whereby the melted ink droplets are ejected onto the sacrificial liquid layer on the intermediate transfer member, as disclosed in, for example, U.S. Pat. No. 5,389,958. Transfer from the intermediate transfer member to the final recording substrate can be by any desired or suitable method, such as by passing the final recording substrate through a nip formed by the intermediate transfer member and a back member, which can be of any desired or effective configuration, such as a drum or roller, a belt or web, a flat surface or platen, or the like.

The present disclosure is also directed to a printer containing the inks described herein. Specifically, the present disclosure relates to a printer cartridge containing the inks described herein, as well as to a printer containing the printer cartridge.

An advantage of the ink compositions of the present disclosure is that they can provide lower gloss images than otherwise available. For example, when two comparable ink compositions are used, one containing the curable wax component and one not containing the curable wax component, the ink containing the curable wax component can provide an image gloss that is lower (less glossy or more matte). For example, the ink compositions of the disclosure containing a curable wax component can provide an image gloss value such as of about 20 to about 60 ggu, or about 30 to about 50 ggu, rather than a higher gloss value of about 70 to about 90 ggu. Accordingly, the curable wax component in the ink composition can pro vide a reduced gloss value of about 20 to about 40 ggu, such as about 30 ggu, as compared to a comparable ink composition not including the curable wax component.

An example is set forth hereinbelow aid is illustrative of different compositions and conditions that can be utilized in practicing the disclosure. All proportions are by weight unless otherwise indicated. It will be apparent, however, that the disclosure can be practiced with many types of compositions and can have many different uses in accordance with the disclosure above and as pointed out hereinafter.

EXAMPLES

Example 1

Preparation of Waxy Acrylate UNILIN® 350-Acrylate

UNILIN® 350 is a hydroxyl-terminated polyethylene wax available from Baker-Petrolite (Sand Springs, Okla.). It has an $M_n$ approximately equal to 375 g/mol.

UNILIN® 350-acrylate is an acrylate-modified wax based on UNILIN® 350. UNILIN® 350-acrylate was prepared as follows: To a 2 L three neck flask equipped with a reflux condenser, dropping funnel, thermometer, and Dean-Stark trap was added UNILIN® 350 (1.0 equiv., 200 g, hydroxyl number 125.80 mg KOH/g, 80 wt %, obtained from Baker Petrolite, Tulsa, Okla.), p-toluenesulfonic acid (1.99 g, 0.8 wt %, obtained from Sigma-Aldrich Co., Milwaukee, Wis.), hydroquinone (0.25 g, 0.1 wt %, obtained from Sigma-Aldrich Co., Milwaukee, Wis.) and toluene (600 mL). The reaction mixture was heated until dissolved. Acrylic acid (1.5 equiv., 46 mL, 19 wt %) was added slowly by the addition funnel. The reaction was allowed to reflux until water ceased collecting in the Dean-Stark trap. Completion of the reaction was confirmed by $^1$H NMR spectroscopy in toluene-$d_8$ (80° C.): the methylene protons adjacent to the hydroxyl group (δ3.38, t) were consumed and replaced by a series of triplets between δ4.27 and 3.97, representing $RCH_2C\underline{H_2}OOCCH{:}CH_2$. At the end of the reaction, the mixture was cooled to room temperature and filtered. The solid was triturated with methanol, filtered, and dried in a vacuum oven. The toluene filtrate was concentrated in vacuo, triturated with cold methanol, filtered, and dried in a vacuum oven. In total, 156 g of a yellow solid (broad mp ca. 50° C.) was recovered. $^1$H NMR (300 MHz, toluene-$d_8$, 80° C.) δ 6.29-6.19 (1H, $dd_1$, $J_{dd}2$=17.3, 1.7 Hz and $dd_2$, $J_{dd2}$=17.3, 1.7 Hz), 6.03-5.94 (1H, $dd_1$, $J_{dd1}$=17.3, 10.4 Hz and $dd_2$, $J_{dd2}$=17.3, 10.4 Hz), 5.36-5.33 (1H, $dd_1$, $J_{dd1}$=10.4, 1.7 Hz and $dd_2$, $J_{dd2}$=10.4, 1.7 Hz), 4.27 (0.6H, t, J=6.5 Hz), 4.21 (0.3H, t, J=6.4 Hz), 4.06-3.96 (2.5H, $t_1$, $J_{t1}$=6.7 Hz and $t_2$, $J_{t2}$=6.7 Hz), 2.42-2.29 (0.9H, m), 2.28-2.16 (0.4H, m), 1.65-1.43 (3.614, m), 1.43-1.25 (104H, m), 0.91 (5.8H, t, J=6.5 Hz).

Example 2

Preparation of Curable Composite Gellant Comprised of a Curable Epoxy Resin and a Polyamide Resin A curable epoxy polyamide composite gellant was prepared as follows. In a 200 mL round bottom flask equipped with reflux condenser, thermometer and addition funnel, 7.08 g (28.5% by weight of total materials) of DER 383 (a Bisphenol A-co-epichlorohydrin epoxy resin obtained from Dow Chemical) was added along with 14.16 g (57.0% by weight) of SYLVAGEL #1015-32 polyether-polyamide copolymer resin obtained from Arizona Chemical and 0.087 g (0.35% by weight) of triphenylphosphine catalyst. The mixture was stirred for 1 hour at 90° C., after which time was first added a prepared solution of acrylic acid (2.57 g, 10.35% by weight) and 4-methoxyphenol as polymerization inhibitor (0.0125 g, 0.05% by weight), followed with a second prepared solution containing lauric acid (0.84 g, 3.40% by weight) and triphenylphosphine catalyst (0.087 g, 0.35% by weight). The temperature of the reaction mixture was increased to 115° C. and stirred for an additional 3 hours, thereby forming the acrylate modified epoxy-polyamide composite gellant. The hot product was poured out of the flask into a container to obtain a hardened, yellow opaque gel.

Example 3

Preparation of Inks

Inks 1 and 2 were made containing the components listed in Table 1.

TABLE 1

| Component | Function | Ink Formulation (wt %) 1 | 2 |
|---|---|---|---|
| Unilin 350 acrylate wax (Example 1) | Reactive wax | 8.88 | 0 |
| Curable Composite Gellant (Example 2) | Gellant | 7.11 | 7.11 |
| SR9003 (propoxylated neopentyl glycol diacrylate, a low viscosity monomer from Sartomer Company, Inc.) | Reactive monomer | 71.37 | 71.37 |
| Irgacure 2959 1-[4-(2-hydroxyethoxy)-phenyl]-2-hydroxy-2-methyl-1-propane-1-one from Ciba Specialty Chemicals, Inc.) | Photoinitiators | 1.77 | 1.77 |
| DAROCUR ® ITX (from Ciba Specialty Chemicals) | | 1.77 | 1.77 |
| Irgacure 379, 2-dimethylamino-2-(4-methylbenzyl)-1-(4-morpholin-4-ylphenyl)-butanone (available from Ciba) | | 2.66 | 2.66 |

TABLE 1-continued

| Component | Function | Ink Formulation (wt %) 1 | 2 |
|---|---|---|---|
| polyether-poryamide copolymer resin SYLVAGEL #1015-32 obtained from Arizona Chemical | Co-gellant | 0 | 2.8 |
| Irgastab UV 10 (a radical scavenger from Ciba Specialty Chemicals, Inc.) | Stabilizer | 0.17 | 0.17 |
| Sun UVD-K007 black pigment dispersion (3% pigment) | Colorants | 6.22 | 0 |
| Sun UVD-B cyan pigment dispersion (3% pigment) | | 0 | 6.22 |

The inks were formulated as follows: The ink components were melt-mixed at 80° C. and filtered through a 2 micron glass fiber filter. The inks were jetted on a Xerox Model 860 printer modified to jet directly to paper and operate the printhead at 80° C. The gloss of an area of solid fill was measured using a Gardner gloss meter at 75° and the values are found in Table 2 below. Similar printing is conducted using a conventional Xerox 7750 high gloss toner for comparison. All paper is 120 gsm Xerox Digital Colour Gloss.

TABLE 2

| | UV Ink 1 gloss at 75° | | UV Ink 2 gloss at 75° | | Xerox 7750 Toner gloss at 75° Cyan | | Xerox 7750 Toner gloss at 75° Black | |
|---|---|---|---|---|---|---|---|---|
| | Image | Paper | Image | Paper | Image | Paper | Image | Paper |
| Left | 49.9 | 68.0 | 80.8 | 71.2 | 71.9 | 68.7 | 69.1 | 68.7 |
| Center | 51.4 | 69.8 | 83.3 | 69.9 | 76.1 | 69.0 | 75.4 | 69.0 |
| Right | 46.2 | 69.2 | 79.8 | 69.7 | 79.3 | 67.3 | 78.1 | 67.3 |
| Average | 49.1 | 69.0 | 81.3 | 70.3 | 71.8 | 68.3 | 74.2 | 68.3 |

The Examples demonstrate that ink compositions according to the disclosure provide a gloss reduction of about 30 ggu and result in satisfactory depiction of text and business graphics.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A radiation curable ink comprising:

a curable monomer or oligomer;

a curable wax;

a colorant;

at least one initiator; and at least one gellant in an amount of about 5% to about 15% by weight of the ink.

2. The radiation curable ink according to claim 1, comprising a curable monomer.

3. The radiation curable ink according to claim 1, wherein said at least one initiator comprises at least one radiation-activated initiator that initiates polymerization of said curable monomer and said curable wax.

4. The radiation curable ink according to claim 1, wherein said curable monomer or oligomer contains at least one reactive moiety selected from the group consisting of acrylate, methacrylate, alkene, allylic ether, epoxide and oxetane.

5. The radiation curable ink according to claim 1, wherein said curable monomer or oligomer is selected from the group consisting of acrylated esters, acrylated polyesters, acrylated ethers, acrylated polyethers, acrylated epoxies, urethane acrylates, polyacrylates, amine acrylates, acrylic acrylates, and mixtures thereof.

6. The radiation curable ink according to claim 1, wherein said curable wax is a wax functionalized with a curable group selected from the group consisting of acrylate, methacrylate, alkene, allylic ether, epoxide, oxetane, and mixtures thereof.

7. The radiation curable ink according to claim 6, wherein said curable wax is a waxy acrylate.

8. The radiation curable ink according to claim 6, wherein said wax that functionalized with a curable group is selected from the group consisting of hydroxyl-terminated polyethylene waxes, Guerbet alcohols, $C_{36}$ dimer diols, carboxylic acid-terminated polyethylene waxes, Guerbet acids, $C_{36}$ dimer acids, and mixtures thereof.

9. The radiation curable ink according to claim 1, wherein said colorant is selected from the group consisting of pigment, dye, mixtures of pigment and dye, mixtures of pigments, mixtures of dyes, and mixtures of pigments and dyes.

10. The radiation curable ink according to claim 1, comprising about 20 to about 90% by weight of the curable monomer or oligomer, about 1 to about 25% by weight of the curable wax, and about 0.1 to about 15% by weight of the colorant, all by weight of the ink.

11. The radiation curable ink according to claim 3, comprising about 40 to about 80% by weight of the curable monomer or oligomer, about 8 to about 9% by weight of the curable wax, about 1 to about 8% by weight of the colorant, and about 1 to about 10% by weight if the radiation-activated initiator, all by weight of the ink.

12. The radiation curable ink according to claim 3, wherein said radiation-activated initiator is activated by ultra-violet light.

13. The radiation curable ink according to claim 3, wherein said at least one radiation-activated initiator is a photoinitiator selected from the group consisting of benzyl ketones, monomeric hydroxyl ketones, polymeric hydroxyl ketones, α-amino ketones, acyl phosphine oxides, metallocenes, benzophenone, benzophenone derivatives, isopropyl thioxanthenones, arylsulphonium salts and aryl iodonium salts.

14. The radiation curable ink according to claim 1, wherein said gellant is selected from the group consisting of a curable gellant comprised of a curable polyamide-epoxy acrylate component and a polyamide component, a curable composite gellant comprised of a curable epoxy resin and a polyamide resin, and mixtures thereof.

15. The radiation curable ink according to claim 1, having a gloss of about 20 to about 60 ggu after curing.

16. A method for forming an image, said method comprising:

applying the radiation curable ink of claim 1 to a substrate in an imagewise manner; and exposing the radiation curable ink to radiation to cure the ink.

17. The method according to claim 16, wherein said radiation curable ink is applied to the substrate by ink jet printing.

18. The method according to claim 16, wherein said radiation is ultra-violet light.

19. A printer cartridge comprising a radiation curable ink according to claim 1.

20. A printer comprising a printer cartridge according to claim 19.

* * * * *